JOHN M. ROLLETT
INVENTOR

BY Hall & Houghton

ATTORNEY

JOHN M. ROLLETT
INVENTOR

BY Hall & Houghton

ATTORNEY

JOHN M. ROLLETT
INVENTOR

BY Hall & Houghton
ATTORNEY

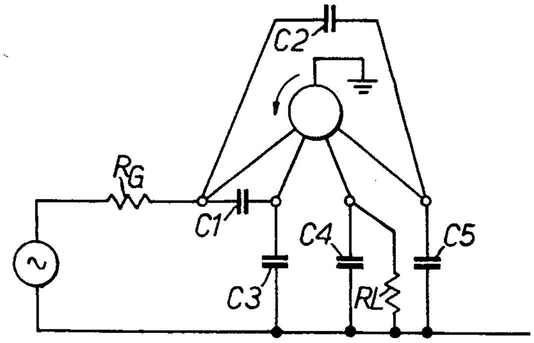
FIG. 9
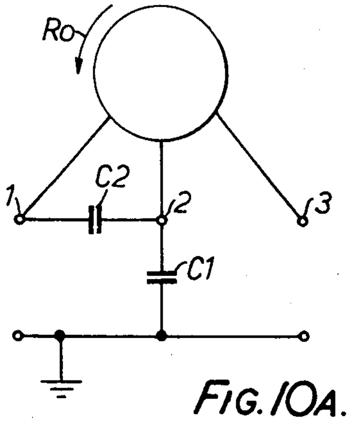
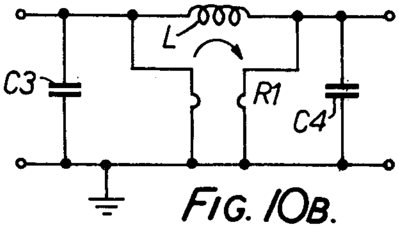
FIG. 10A FIG. 10B
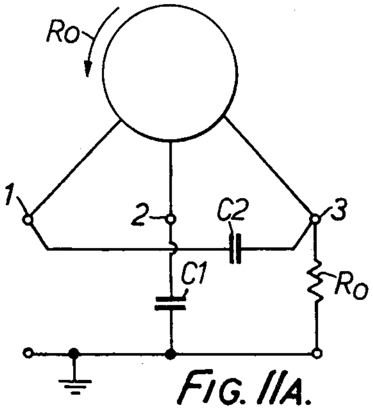
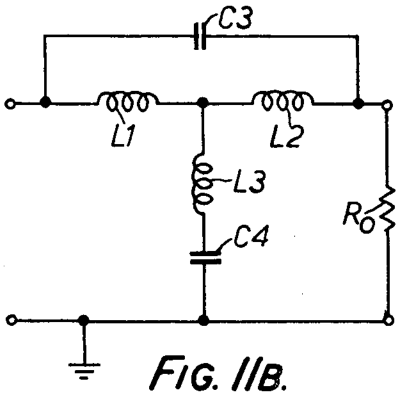
FIG. 11A FIG. 11B
JOHN M. ROLLETT
INVENTOR
BY
ATTORNEY

JOHN M. ROLLETT
INVENTOR

BY Hall & Houghton
ATTORNEY

United States Patent Office 3,716,729
Patented Feb. 13, 1973

3,716,729

ALL-PASS AND LOW-PASS FILTER COMPRISED OF ACTIVE ELEMENT CIRCULATORS

John Mortimer Rollett, London, England, assignor to The Post Office, London, England Filed Sept. 8, 1969, Ser. No. 855,879
Int. Cl. H03h *7/02, 11/00*
U.S. Cl. 307—295 13 Claims

ABSTRACT OF THE DISCLOSURE

This specification discloses the use of a circulator having at least three ports for the simulation of networks which in their normal realisations include one or more inductive elements. Various circuit arrangements are described including one or more capacitors connected in respective paths between different pairs of ports of the circulator and possibly also including one or more capacitors connected from ports of the circulator to ground, input and output ports of the circuits being connected to ports of the circulator. Depending on the different connections of the capacitors of the circulator low-pass and all-pass filters of various orders can be produced. The use of the invention has the advantage that the filters can be produced without the incorporation of physical inductors which is of importance in the realisation of the filters in micro-circuit form.

This invention relates to circuit arrangements including circulators.

A multiport circulator having $n$ ports is a circuit device in which (if the ports are numbered consecutively from 1 to $n$) a signal applied at any port $k$ appears at the next port $k+1$ in the sequence but at no other port, when all the ports are correctly terminated. A signal applied to port $n$ appears at port 1.

An object of the invention is to provide a network including one or more circulators. According to the invention there is provided a circuit arrangement including an input port, an output port and a ciruulator having at least three ports in a sequence, the input port being connected to one port of the circulator and the output port to another port of the circulator, and wherein at least one reactive impedance is provided, the or each impedance being connected in a respective path joining two ports of the circulator.

By use of the present invention, networks which might otherwise include inductors or transformers can be constructed economically without the use of inductors or transformers, so that, for example, the networks may readily be realised in microcircuit form or other problems associated with use of physical inductors or transformers are avoided.

By way of example, the invention will be described in greater detail with reference to the accompanying drawings, in which:

FIG. 2A shows one embodiment of the invention of which

FIG. 9 is a diagram of a further example of the invention;

FIG. 10A shows another example of the invention with an equivalent circuit shown in FIG. 10B;

FIG. 11A shows a second-order all-pass circuit incorporating the invention of which FIG. 11B is one equivalent circuit;

One form of circulator suitable for use in carrying out the present invention is described in detail in co-pending application Ser. No. 805,483 but for completeness of disclosure one basic embodiment of a circulator employing active elements, as disclosed in that application, is shown in FIG. 1.

Figure 1A:
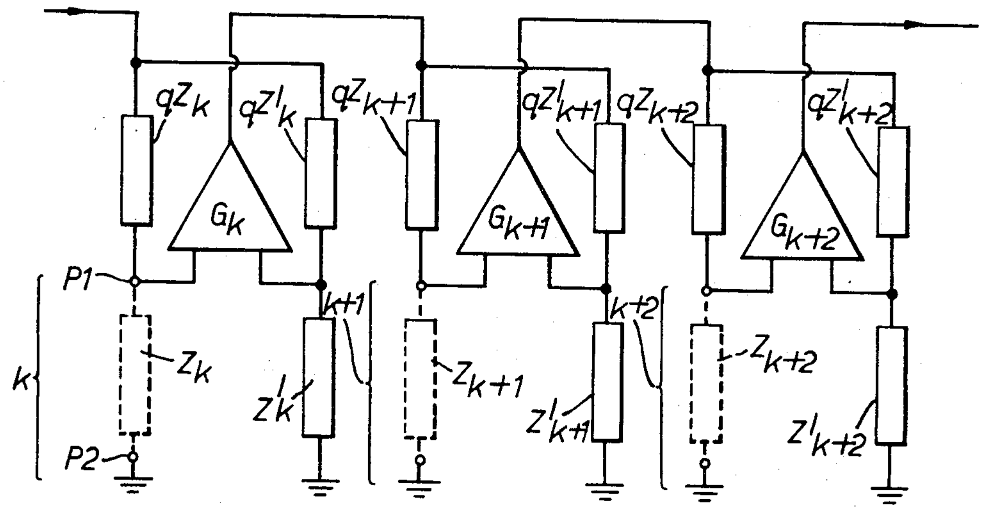
FIGS. 1A and 1B show one example of a three-port circulator employing active elements suitable for use in the embodiments shown in subsequent figures.

FIG. 1A shows, schematically, any three successive ports of an active, multi-port circulator. The ports are connected in sequence $k$, $k+1$, $k+2$ etc. ($k=1 \ldots n$). Associated with each port is a differential amplifier G (an amplifier the output voltage of which is proportional to the difference in potential between the two inputs to the amplifier) having negligible reverse transmission. One terminal $P_1$ of each port is connected to one terminal of the amplifier of that port and the other terminal P2 of each port is connected to ground. For the purpose of analysis the ports are closed by external impedances $Z_k$, $Z_{k+1}$, $Z_{k+2}$ etc. Each amplifier (e.g. amplifier $G_k$) has its output applied to both input terminals of the amplifier ($G_k+_1$) associated with the next port ($k+1$) through two separate potential dividers:

$$Z_{k+1}, qZ_{k+1}, \text{and } Z'_{k+1}, qZ'_{k+1}$$

where $q$ may differ form port to port. If the ratios of the dividers are equal, the differential input signal is zero; consequently the output signal of that amplifier ($G_{k+1}$) is zero and a signal applied at one port appears at the next port in the sequence but is not passed on to any other ports.

The terminating impedance (e.q. $Z_k$ for port $k$) $Z'_k$ forming part of one of the potential dividers for the amplifier ($G_k$) associated with that port can be made equal to the input impedance at that port by suitable choice of impedance values in the potential dividers or by internal impedances connected in series or in parallel with that port.

The differential amplifiers can each comprise a long-tailed transistor pair including emitter feedback resistors; each pair may be fed from a constant current source and have its output connected, with or without phase reversal, to the next port by a common collector transistor stage. In one alternative arrangement, differential operational amplifiers may be used, i.e. amplifiers having high gain (typically several thousands or more) high (ideally infinite) input impedance and low (ideally zero) output impedance.

Figure 1B:
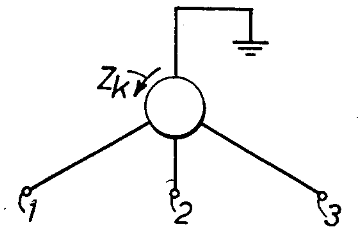

FIG. 1B is a diagrammatic representation of a three-port lossless circulator, for example a circulator of the type shown in FIG. 1A, which is such that the correct terminating impedances, the input impedances (when the circulator is correctly terminated) and the transimpedances are all equal to a value $Z_k$ known as the characteristic impedance. Such a circulator is lossless and consumes no signal power; the gain between adjacent ports is unity when correctly terminated. "Lossless" implies in practice having losses small enough to be neglected. The arrow indicates the direction of circulation. This or a similar representation (for circulators having a greater number of ports) will be used in the subsequent figures.

In general the direction of circulation of the circulator is significant, and in the embodiments shown in all of the following figures the direction shown should be observed.

Figure 2A:
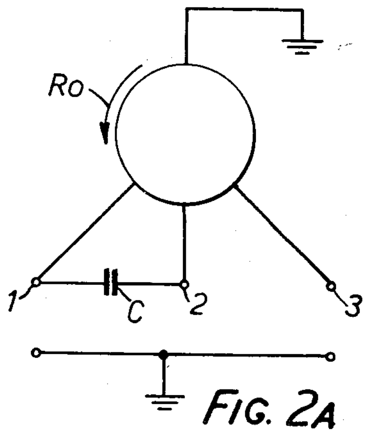
Figure 2B:
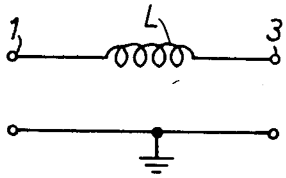
FIG. 2B is an equivalent circuit.

One embodiment of the invention is shown in FIG. 2A which shows a three-port circulator, each port having a grounded terminal with a capacitor C connected between the ungrounded terminals of ports 1 and 2. The circulator has a characteistic impedance $R_0$. An equivalent circuit is shown in FIG. 2B in which a floating inductor L having a value $R_0^2C$ is connected from the ungrounded terminal of port 1 to the ungrounded terminal of port 3.

Figure 3A:
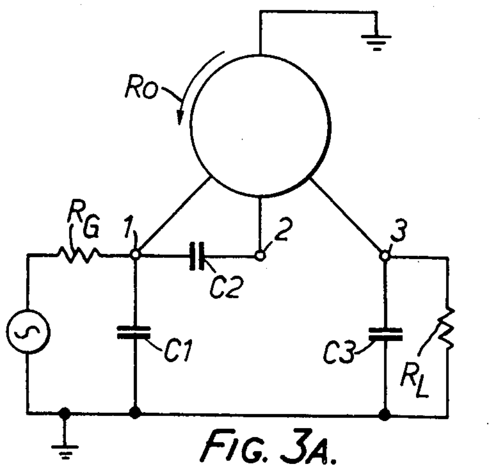
FIGS. 3A and 4A show realisations, using the embodiments of FIG. 2A, of certain third-order filters
Figure 3B:
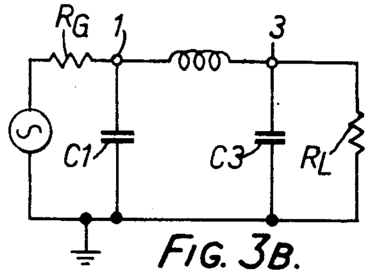
FIGS. 3B and 4B show respective equivalent circuits.
Figure 4A:
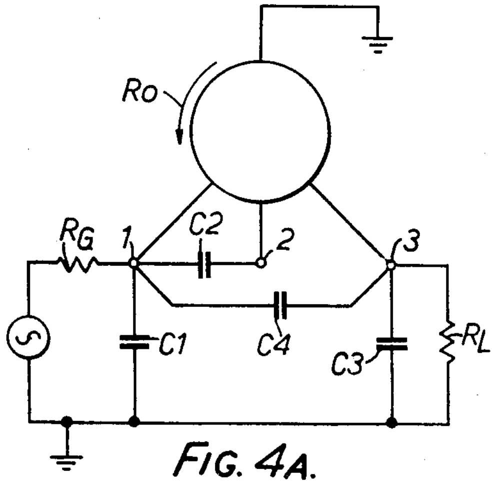
Figure 4B:
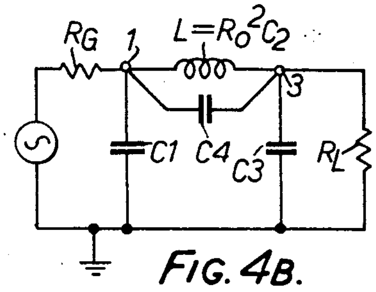

Simple applications of the arrangement shown in FIG. 2A are depicted in FIGS. 3A and 4A. FIGS. 3A and 4A illustrate realisations of third-order low-pass filters. FIGS. 3B and 4B show equivalent circuits of FIGS. 3A and 4A respectively. Suitable component values for FIGS. 3A and 4A are shown below in Tables A and B respectively which when employed, the circuits of FIGS. 3A and 4A produce a third-order Butterworth low-pass filter and a third-order elliptic low-pass filter respectively.

TABLE A

| | |
|---|---|
| $R_G$=1KΩ | $C_1$=0.159 μf. |
| $R_L$=1KΩ | $C_2$=0.0796 μf. |
| $R_0$=2KΩ | $C_3$=0.159 μf. |

Using these values, the filter has a cut-off frequency of 1 kHz.

TABLE B

| | |
|---|---|
| $R_G$=10KΩ | $C_1$=24,054 pf. |
| $R_L$=10KΩ | $C_2$=158,400 pf. |
| $R_0$=3KΩ | $C_3$=24,054 pf. |
| | $C_4$=10,062 pf. |

Using these values, a filter having a pass-band ripple of 0.5 db, a stop-band rejection of 20 db and a cut-off frequency of 837 Hz. can be realised.

Figure 5:
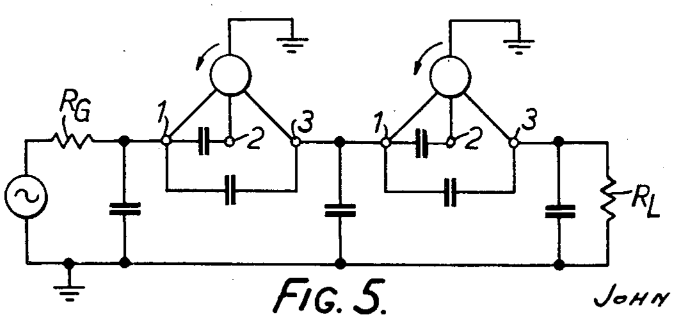
FIG. 5 shows a realisation of a fifth-order transfer function by use of two circulators in a manner according to the invention.

By combining together two stages of the types shown in FIG. 3A or FIG. 4A, fourth and fifth-order low-pass transfer functions can be realised. FIG. 5 shows a fifth-order filter produced by combining two circuits as shown in FIG. 4A.

Figure 6A:
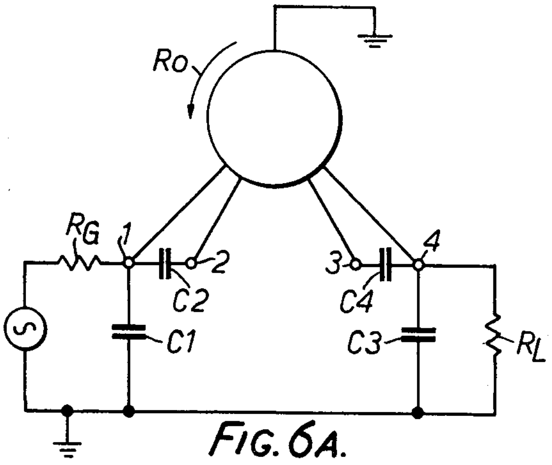
FIG. 6A shows the realisation of a network having a fourth-order transfer function using the invention.
Figure 6B:
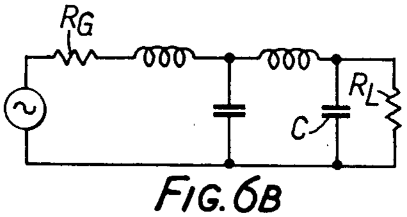
FIGS. 6B and 6C shows alternative equivalent circuits.
Figure 6C:
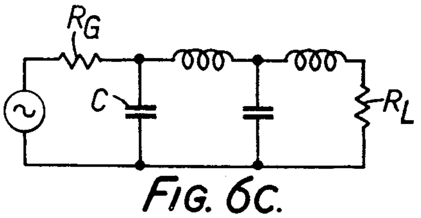

Such higher order transfer functions can also be realised in other manners, in accordance with the invention. For example, FIG. 6A shows a fourth-order low-pass filter using a four-port circulator. Two possible equivalent circuits are shown in FIGS. 6B and 6C each including two floating inductors and two capacitors. Note that the capacitor C in FIGS. 6B and 6C is connected across the input or the output of the network in the different equivalent circuits. The circuit shown in FIG. 6A cannot be reduced to a simple equivalent circuit having nodes corresponding to ports of the circulator and an equivalent circuit is realised by reference to the overall performance of the filter. Using component values given in Table C, a fourth-order Butterworth filter having a cut-off frequency of 3,181 Hz. is realised by the circuit of FIG. 6A.

TABLE C

| | |
|---|---|
| $R_G$=5KΩ | $C_1$=7,650 pf. |
| $R_L$=5KΩ | $C_2$=18,480 pf. |
| $R_0$=5KΩ | $C_3$=18,480 pf. |
| | $C_4$=41,380 pf. |

Using component values given in Table D in FIG. 6A, a Tchebychev 3 db low-pass fourth-order filter can be realised, having a cut-off frequency of 3,181 Hz.

TABLE D

| | |
|---|---|
| $R_G$=10KΩ | $C_1$=34,552 pf. |
| $R_L$=20KΩ | $C_2$=7,769 pf. |
| $R_0$=5KΩ | $C_3$=5,723 pf. |
| | $C_4$=41,380 pf. |

Figure 7:
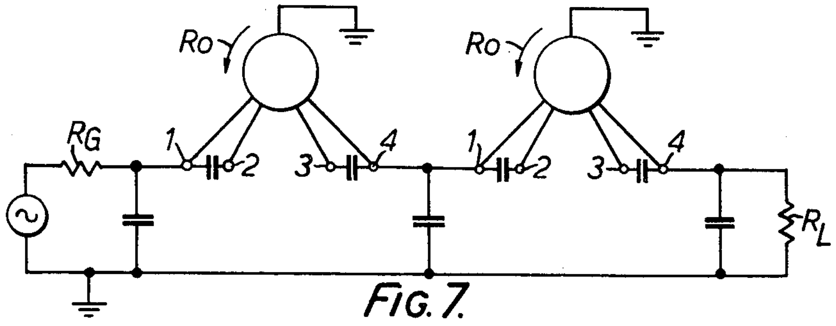
FIG. 7 shows a seventh order filter using two four-port circulators in accordance with an example of the invention.
Figure 8:
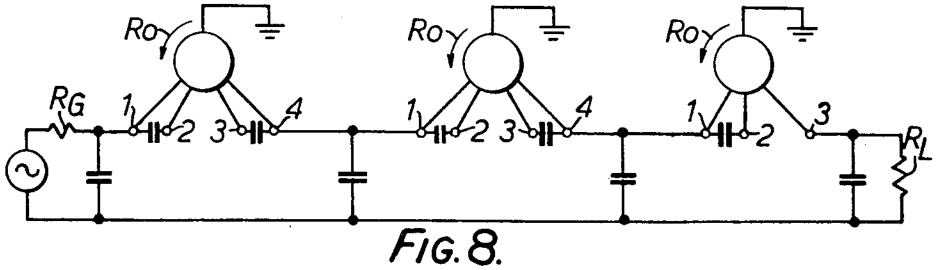
FIG. 8 shows a ninth-order filter constructed according to another example of the invention.

In accordance with the invention, low-pass filters of higher order can be produced by cascading three-port and four-port circulators, with appropriately connected capacitors in a manner similar to that shown in FIG. 5 for two three-port circulators. For example, FIG. 7 shows a seventh-order low-pass filter using two four-port circulators and FIG. 8 shows a ninth-order low-pass filter employing two four-port and one three-port circulator.

FIG. 9 shows a further example of the invention by means of which and by using the component values given in Table E, a fourth-order elliptic low-pass filter having a pass-band ripple of 0.1 db, a stop-band rejection of 20.4 db and a cut-off frequency of 2.72 kHz. can be realised.

TABLE E

| | |
|---|---|
| $R_G$=40,550Ω | $C_1$=4,139 pf. |
| $R_L$=1,909Ω | $C_2$=9,133 pf. |
| $R_0$=5KΩ | $C_3$=4,139 pf. |
| | $C_4$=9,133 pf. |
| | $C_5$=20,719 pf. |

FIG. 10A shows a three-port circulator employed in a manner embodying the present invention to provide a realisation of a building block incorporating a floating inductor. In FIG. 10A a capacitor C1 is connected between port 2 and ground and a capacitor C2 between ports 1 and 2. An equivalent circuit, including a floating inductor between ports 1 and 3 and a gyrator between ports 1, 3 and ground is shown in FIG. 10B and the relationship between FIGS. 10A and 10B is shown in Table F.

TABLE F $$L=R_0^2(C_1+C_2) \qquad C_3=\frac{C_1\ C_2}{C_1+C_2}$$

$$R_1=\frac{R_0\ C_2}{C_1+C_2} \qquad C_4=\frac{C_1\ C_2}{C_1+C_2}$$

The building block shown in FIG. 10A, in conjunction with other capacitors connected to the input and output port terminals 1 and 3, allows the realisation of transfer functions containing two or three left half-plane poles, and one or two zeros with (depending on the sense of the circulator) may be either in the left half plane or in the right half plane. FIG. 11A shows a second-order constant-resistance all-pass circuit conventional lumped component forms of which employ either transformers or from two to four inductors each. One conventional lumped component equivalent, when $C_2>C_1$, is shown in FIG. 11B. The relationships components of FIGS. 11*a* and 11*b* are shown in Table G.

TABLE G $$L_1=R_0^2C_1 \qquad C_3=\tfrac{1}{2}C_2$$

$$L_2=R_0^2C_1 \qquad C_4=2C_1$$

$$L_3=\frac{R_0^2}{2}(C_2-C_1)$$

Figure 12:
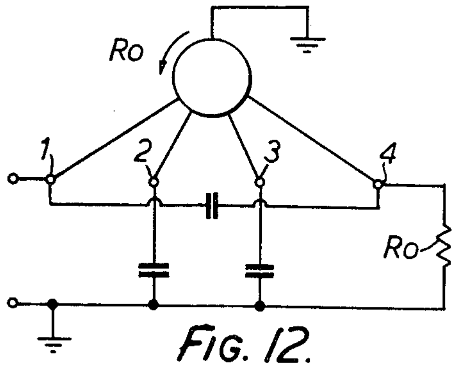
FIGS. 12 and 13 shows respectively thrid and fourth-order all-pass circuits according to further examples of the invention.
Figure 13:
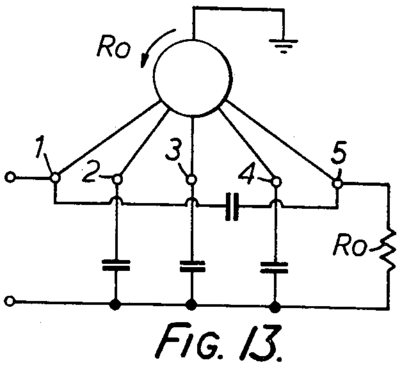

Higher order constant-resistance all-pass networks may be produced in a similar way using circulators with more than three ports. For example, FIG. 12 shows a third-order network of this type using a four-port circulator, and FIG. 13 shows a fourth-order network employing a five-port circulator. Note that the load impedance for the networks of FIGS. 11A, 12 and 13 should be equal to $R_0$ if the input impedance is to equal $R_0$.

A particular advantage of the filters described is that since a circulator using active elements can be made lossless, that is it neither absorbs nor generates signal power, and since the filters described above are composed of circulators and capacitors (which ideally, are also lossless), the sensitivity of the transfer function realised by each filter to small changes in the capacitors can be very low compared with active inductorless filters which are not essentially lossless. In fact, the sensitivity of filters produced in accordance with the invention to changes in reactance values is similar to that of an equivalent lumped-component LC filter.

A further advantage of the filters described is that if the values of the capacitors available in practice are not exactly the design values, and if it is not convenient to make small changes in these values (for example with discrete components or micro-electronic components), then the desired transfer function may be achieved by making small adjustments to the components of the circulator. Provided the changes are small e.g. of the order of a few percent, the low sensitivity, to changes mentioend above will hardly be increased. Even large changes may be made but at the expense of increased sensitivity to changes of reactance values.

Figure 14A:
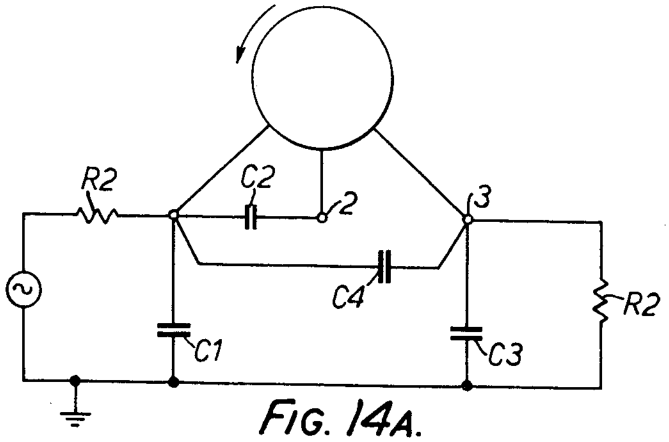
FIG. 14A shows a third-order low-pass filter realisation using a three-port circulator employing differential operational amplifiers as illustrated by FIG. 14B.
Figure 14B:
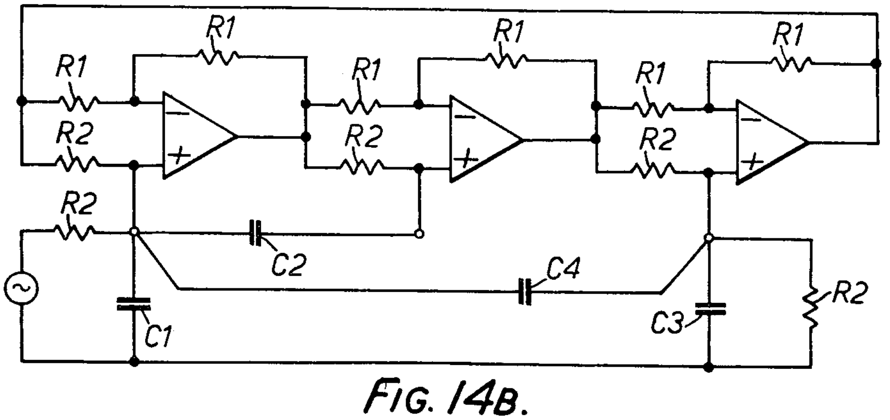

The characteristic impedance of the active element circulator described above as suitable for use in the above embodiments is usually obtained from a number of equal resistors, one per stage or port. If these resistors are all changed by the same amount, the filter characteristic is shifted in frequency but is otherwise unchanged, that is, frequency sealing is very readily achieved. For example, a structure containing fixed capacitors can be tailored to meet a given specification simply by the provision of three (or more, depending on the number of ports of the circulator) equal resistors. FIG. 14A shows a third order elliptic low pass filter and FIG. 14B shows the circuit with a circulator employing operational differential amplifiers shown in more detail. If the component values of FIG. 14B are as given in Table H, a third order low-pass elliptic filter with a 0.5 db ripple, a stop-band rejection of 20 db and a cut-off frequency of 8.37 kHz. can be realized. If the resistors $R_2$ are all equal to 3KΩ, the cut-off frequency is 2.79 Hz. and if equal to 10 KΩ, the cut-off frequency is 0.837 kHz.

TABLE H

| | |
|---|---|
| $R_1$=5 KΩ | $C_3$=24,054 pf. |
| $C_1$=24,054 pf. | $C_4$=10.062 pf. |
| $C_2$=14,250 pf. | |

For some applications, a variable filter may be required, with characteristics to remain unchanged geometrically or logarithmically, e.g. a ½ octave band-pass filter to be swept from 100 Hz. to 20 kHz. Such a variable filter may be released by providing rotary variable resistors, one for each port of the circulator, and ganging them together.

What is claimed is:

1. A circuit arrangement including:
(a) an input port,
(b) an output port, and
(c) a circulator having at least three ports arranged in sequence in a closed cycle,
(d) the circulator comprising:
(1) a plurality of pairs of signal paths including amplifier means, the pairs of paths being respectively associated with the ports of the circulator, the signal paths in each pair having a common input point and a common output, and the signal gain in the paths due to the amplifing means being of equal magnitude, but of opposite senses with respect to one another so that a signal applied to the common input point of a pair of paths is self-cancelling at the common output point of the pair of paths,
(2) a connection from a point of one of the signal paths other than the common output point and the common input point thereof to the port associated with the pair of signal paths, and
(3) a connection from the common output point of the pair of paths associated with any one port to the common input point of the pair of paths associated with the next port in the sequence,
(e) the input port of the arrangement being connected to a first port of the circulator and the output port of the arrangement being connected to a second port of the circulator following the first port in the sequence after at least one intermediate port,
(f) said at least one intermediate port being connected to ground through a capacitor, and
(g) a further capacitor connected from the first port to another port of the circulator.

2. An arrangement according to claim 1, including at least one further capacitor connected from a respective port of the circulator to a point of reference potential.

3. A circuit arrangement according to claim 1 wherein the circulator has first, second and third ports connected in sequence, wherein the first port is connected to the input port, the third port is connected to the output port, and the further capacitor is connected from the first to the second ports.

4. An all-pass electrical network comprising a circuit arrangement according to claim 1 wherein
the circulator has first, second and third ports connected in sequence, wherein the first port is connected to the input port, the third port is connected to the output port and the further capacitor is connected from the first to the third ports.

5. An all-pass electrical network comprising a circuit arrangement according to claim 1, wherein the circulator has $n$ ports where $n$ is an integer greater than three having first, second . . . $n$th ports connected in sequence wherein the first port is connected to the input port, the $n$th port is connected to the output port, and the further capacitor is connected from the first port to the $n$th port of the circulator.

6. A network as claimed in claim 5, wherein $n$=4.

7. A network as claimed in claim 5, wherein $n$=5.

8. A low-pass electrical filter comprising a circuit arrangement according to claim 1 wherein the circuit has first, second, third and fourth ports connected in sequence, in which the first port is connected to the input port of the filter, the third is connected to the output port of the filter, and two of said further capacitors are provided, the first of which is connected from the first to the second port and the second of which is connected from the first to the fourth port, and there is provided a further capacitor in shunt with the output port.

9. A low-pass electrical filter comprising a circuit arrangement according to claim 1, wherein the circulator has first, second, third and fourth ports connected in sequence, in which the first port is connected to the input port of the filter, and there are provided two of said further capacitors the first of which is connected from the first to the second port, and the second of which is connected from the third to the fourth port, and there are provided another capacitor connected in shunt with the input port and another capacitor connected in shunt with the output port.

10. A filter comprising two or more filters according to claim 9 connected in tandem.

11. A low-pass electrical filter comprising a circuit arrangement according to claim 1, wherein the circulator has first, second and third ports connected in sequence, in which the first port is connected to the input port of the arrangement, the third port is connected to the output port of the arrangement and the further capacitor is connected from the first port to the second port, and there are provided another capacitor connected in shunt with the input port and a still further capacitor connected in shunt with the output port.

12. A filter according to claim 11, wherein a fourth capacitor is connected from the first to the third ports of the circulator.

13. A filter comprising two or more filters according to claim 12 connected in tandem.

References Cited

UNITED STATES PATENTS

| | | | |
|---|---|---|---|
| 3,513,401 | 5/1970 | Tokunaga | 328—167 |
| 3,582,803 | 6/1971 | Greenaway | 333—1.1 X |

PAUL L. GENSLER, Primary Examiner

U.S. Cl. X.R.

307—233; 328—167; 333—1.1, 80 R